No. 624,694. Patented May 9, 1899.
W. C. SHELDON.
SEED PLANTER.
(Application filed Nov. 12, 1898.)
(No Model.)
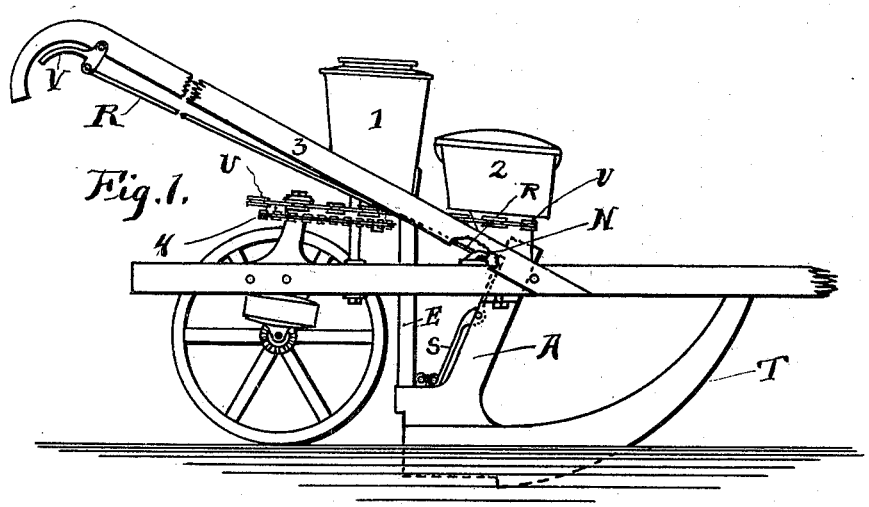
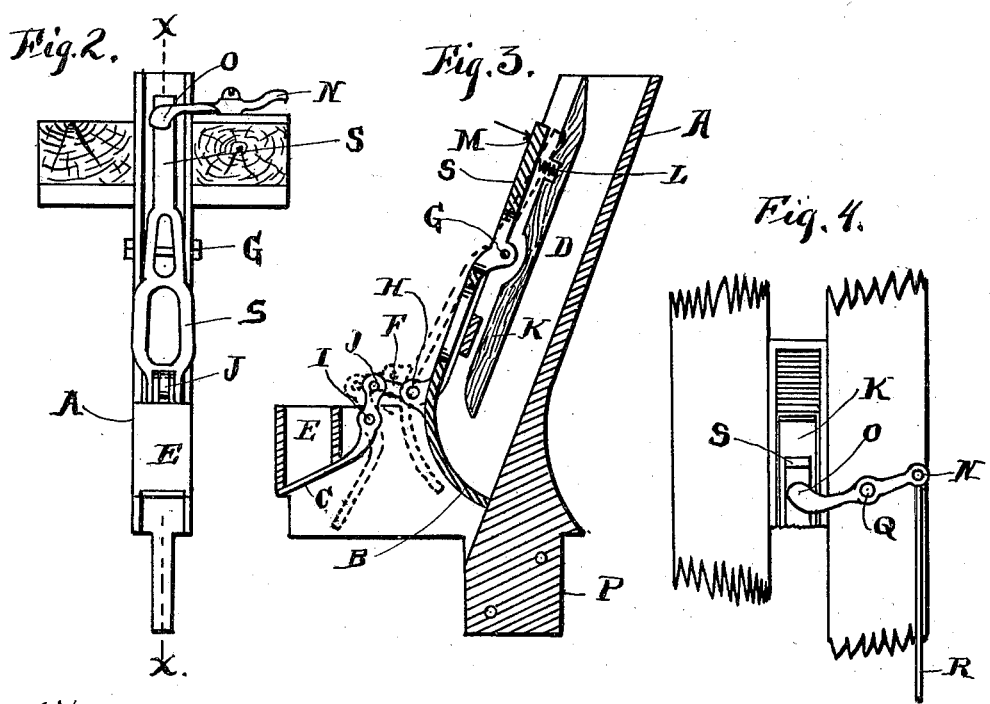
WITNESSES.
Harry J. Perkins.
Dora B. Parker
INVENTOR.
Willard C. Sheldon
BY his ATTORNEY.
Edward Taggart

UNITED STATES PATENT OFFICE.

WILLARD C. SHELDON, OF GRAND HAVEN, MICHIGAN.

SEED-PLANTER.

SPECIFICATION forming part of Letters Patent No. 624,694, dated May 9, 1899.

Application filed November 12, 1898. Serial No. 696,273. (No model.)

*To all whom it may concern:*

Be it known that I, WILLARD C. SHELDON, a citizen of the United States, residing at Grand Haven, in the county of Ottawa and State of Michigan, have invented new and useful Improvements in Seed-Planters, of which the following is a specification.

This invention relates to certain new and useful improvements in seed-planters; and the invention consists in the mechanism and arrangement of parts, hereinafter described and claimed, whereby the operator is enabled to drop seed and fertilizer into the same hill at one operation; also in the construction and arrangement of parts whereby the fertilizer can be operated in connection with seed-drilling or hill-planting or can be dispensed with entirely.

The objects of the invention are, first, to so construct and arrange a seed-planter that fertilizer can be dropped into a hill with the seed, or dropped into a drill or row with the seed, or be entirely detached, so as to be inoperative. These objects I accomplish by means of the mechanism illustrated in the accompanying drawings, in which—

Figure 1 shows a side elevation of a corn or seed planter constructed in accordance with my invention and having attached thereto a device for dropping the fertilizer with the seed. Fig. 2 is a rear elevation of the shoe or shank with the fertilizer and seed dropper attached. Fig. 3 is a sectional view on line X X of Fig. 2. Fig. 4 is a plan or top view of the parts shown in Figs. 2 and 3.

Similar letters and numerals refer to similar parts throughout the several views.

A represents the outside of the seed-tube, the same being attached to the shoe T at the bottom and to the frame of the planter at the top.

B represents the seed cut-off or valve, it being in the example of my invention shown in the drawings the lower or curved portion of the operating-lever which operates both the seed-valve and the fertilizer valve or cut-off.

C represents the fertilizer cut-off.

D represents the seed-channel in the seed-tube A.

E represents the fertilizer channel or tube.

F is a link connection between the seed cut-off and the fertilizer cut-off, the same being adapted to operate the fertilizer cut-off at the same time that the seed cut-off is operated.

G is a pivot on which oscillates or turns the operating-lever S, said operating-lever being curved at the lower end in order to form the seed cut-off.

H is a pivotal connection between the link F and the fertilizer cut-off.

I is a pivotal bearing on which the fertilizer cut-off rocks or oscillates.

J is a pivotal connection between the link F and the fertilizer cut-off C, the fertilizer cut-off being a lever turning upon the pivot I and connected as above stated, by the link F to the seed cut-off.

K is a partition, preferably of wood, situated in the seed-channel D.

L is a spring bearing against the upper end of the lever S, adapted to close and retain closed both the seed cut-off and the fertilizer cut-off, excepting when the same may be opened by pressure, as hereinafter described. This spring immediately returns the lever S and the cut-offs to normal position when the pressure is removed.

M shows the bearing-point on the lever, or the point of contact between O and S.

N is a pivoted lever turning upon the pivot Q and having its end O adapted to bear upon the point M of the lever S. The other end of the lever N is connected by the rod R to the handle V. By operating the handle V the rod R operates the lever N, pressing the point O against the point M of the lever S, pressing the spring L, turning the lever S upon its pivot G, withdrawing the cut-off B from the lower end of the pipe D, and at the same time through the link connection F opening the fertilizer cut-off C. In Fig. 3 the positions of the cut-offs C and B when opened are shown by the dotted lines and when closed by the solid lines. As soon as the handle V is released the spring L throws the lever S back to a normal position, instantly closing the valves C and B.

P is the supporting-frame for the seed-tube.

U is the chain which operates the seed-cup.

1 is the fertilizer-hopper.

2 is the seed-hopper.

3 is the handle of the seeder or corn-planter.
4 is the chain which operates the fertilizer.

Both the seed-disk and the fertilizer-chain are operated by connection with the wheel of the seed-drill or corn-planter in the ordinary manner. As I claim no invention in the mere operation of the corn-planter or seed-drill by means of chain connection, I do not deem it necessary to further describe such connection, it being understood, however, that the said disk at the bottom of the hopper 2 drops into the tube D a sufficient quantity of seed or corn for a single hill and that after the same is dropped into the tube D it is retained by means of the valve or cut-off B until opened by means of the handle above described. The fertilizer, being distributed by means of the ordinary mechanism, drops down into the tube E and there remains until the valve or cut-off C is operated, as above described. The disk or plate used in the hopper 2 is of any suitable form, provided with holes which are adapted to measure the quantity of seed to be dropped at any one time.

The chain connection which operates the fertilizer may be thrown out of gear, so that the fertilizer will not operate. Whenever it is desired to drop the seed in drill and fertilize the drills, the handle V is fastened in position to retain the cut-offs C and B out of position, so that the fertilizer flows down through E, continuously fertilizing the line or row of seed dropped through the tube D.

Having thus described my invention, what I claim to have invented, and desire to secure by Letters Patent, is—

1. The combination with the seed-hopper, and the fertilizer-hopper, of the seed and fertilizer tubes, the spring-pressed operating-lever pivoted between its upper and lower ends and having its lower end curved and extending across the channel through the seed-tube and forming the seed-cut-off valve, a partition arranged vertically in the said channel, a fertilizer-cut-off valve pivoted between its upper and lower ends and extending across the fertilizer-tube, a link pivoted at one end to the upper extremity of the fertilizer-cut-off valve and at its other end to the seed-cut-off valve, a pivoted lever bearing against the upper end of said operating-lever, and a handle for actuating said pivoted lever to swing the operating-lever and simultaneously open the seed and fertilizer cut-off valves, substantially as described.

2. The combination with a seed-hopper, and a fertilizer-hopper, of seed and fertilizer tubes, an operating-lever pivoted between its upper and lower ends to the seed-tube and having its lower end bent forward to extend across the channel through the seed-tube to form the seed-cut-off valve, a fertilizer-cut-off valve pivoted between its upper and lower ends to the fertilizer-tube and extending across the latter, a link pivoted at one end to the seed-cut-off valve and at the other end to the upper extremity of the fertilizer-cut-off valve, a spring acting to swing the operating-lever in one direction to close the seed and fertilizer cut-off valves, and means for swinging said operating-lever against the tension of the spring to simultaneously open both cut-off valves, substantially as described.

In testimony whereof I have hereunto set my hand in presence of two subscribing witnesses.

WILLARD C. SHELDON.

Witnesses:
W. C. SHELDON, Jr.,
B. FRANK HARBECK.